United States Patent
Jung et al.

(10) Patent No.: US 10,296,203 B2
(45) Date of Patent: May 21, 2019

(54) ELECTRONIC DEVICE AND OBJECT CONTROL METHOD THEREFOR

(71) Applicant: Samsung Electronics Co., Ltd., Suwon-si, Gyeonggi-do (KR)

(72) Inventors: In Hyung Jung, Gumi-si (KR); Young Jin Park, Gumi-si (KR); Jong Wu Baek, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 14/840,724

(22) Filed: Aug. 31, 2015

(65) Prior Publication Data

US 2016/0062592 A1  Mar. 3, 2016

(30) Foreign Application Priority Data

Aug. 29, 2014  (KR) .................. 10-2014-0114613

(51) Int. Cl.
| | | |
|---|---|---|
| *G06F 3/0488* | (2013.01) | |
| *G06F 3/041* | (2006.01) | |
| *G06F 3/0484* | (2013.01) | |
| *G06T 11/80* | (2006.01) | |

(52) U.S. Cl.
CPC .......... *G06F 3/0488* (2013.01); *G06F 3/0412* (2013.01); *G06F 3/0416* (2013.01); *G06F 3/04845* (2013.01); *G06F 3/04883* (2013.01); *G06T 11/80* (2013.01); *G06F 2203/04804* (2013.01)

(58) Field of Classification Search
CPC .................................................. G06F 3/0488

USPC ........................................................ 345/173
See application file for complete search history.

(56) References Cited

U.S. PATENT DOCUMENTS

| | | | | |
|---|---|---|---|---|
| 8,407,606 | B1* | 3/2013 | Davidson | G06F 3/0488 345/173 |
| 8,531,410 | B2 | 9/2013 | Roth et al. | |
| 9,021,402 | B1* | 4/2015 | Li | G06F 3/04883 715/863 |
| 2011/0043453 | A1 | 2/2011 | Roth et al. | |
| 2011/0043455 | A1 | 2/2011 | Roth et al. | |
| 2012/0206471 | A1* | 8/2012 | Sarnoff | G06T 11/60 345/581 |
| 2012/0302167 | A1* | 11/2012 | Yun | G06F 3/04883 455/41.2 |
| 2013/0014041 | A1* | 1/2013 | Jaeger | G06F 3/0481 715/765 |
| 2013/0135236 | A1* | 5/2013 | Yano | G06F 3/0488 345/173 |
| 2014/0078318 | A1 | 3/2014 | Alameh | |
| 2014/0104299 | A1* | 4/2014 | Nam | G06F 3/0488 345/589 |

(Continued)

FOREIGN PATENT DOCUMENTS

KR    10-2009-0112440 A    10/2009

*Primary Examiner* — Jason C Olson
(74) *Attorney, Agent, or Firm* — Jefferson IP Law, LLP

(57) ABSTRACT

An electronic device and an object control method therefor are provided. The electronic device includes a display module configured to display at least one object on a screen of the electronic device, a user input module configured to receive a user input, and a processor configured to compare a coordinate of each of the objects with a coordinate of the user input and to control attributes of each of the objects.

19 Claims, 18 Drawing Sheets

(56) References Cited

U.S. PATENT DOCUMENTS

2015/0278983 A1\* 10/2015 Uefuji .................... G09G 5/003
345/173

\* cited by examiner

ELECTRONIC DEVICE AND OBJECT CONTROL METHOD THEREFOR

CROSS-REFERENCE TO RELATED APPLICATION(S)

This application claims the benefit under 35 U.S.C. § 119(a) of a Korean patent application filed on Aug. 29, 2014 in the Korean Intellectual Property Office and assigned Serial number 10-2014-0114613, the entire disclosure of which is hereby incorporated by reference.

TECHNICAL FIELD

The present disclosure relates to an electronic device for controlling attributes of an object according to a user input and a method therefor.

BACKGROUND

Currently, with the development of digital technologies, a variety of electronic devices, such as mobile communication terminals, personal digital assistants (PDAs), electronic notes, smartphones, and tablet personal computers (PCs), which may perform communication and may process personal information during movement of users have been released to the market. These electronic devices may embrace areas of other terminals without remaining within their traditional own areas to reach mobile convergence.

Typically, the electronic devices may have a call function, such as a voice call and a video call, a message transmission and reception function, such as a short message service (SMS)/multimedia messaging service (MMS) and chatting, an electronic note function, a photographing function, a broadcasting play function, a video play function, a music play function, an Internet function, a messenger function, a social networking service (SNS) function, and the like.

Meanwhile, as user interface (UI) technologies or user experience (UX) technologies of the electronic devices are developed, various effects are provided when executing applications or changing screens.

Therefore, a need exists for an electronic device for controlling attributes of an object according to a user input and a method therefor.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for controlling attributes of an object according to a user input and a method therefor.

In accordance with an aspect of the present disclosure, an electronic device is provided. The electronic device includes a display module configured to display at least one object on a screen of the electronic device, a user input module configured to receive a user input, and a processor configured to compare a coordinate of each of the objects with a coordinate of the user input and control attributes of each of the objects.

In accordance with another aspect of the present disclosure, an object control method for an electronic device is provided. The method includes displaying at least one object on a screen of the electronic device, receiving a user input, and comparing a coordinate of each of the objects with a coordinate of the user input and controlling attributes of each of the objects.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
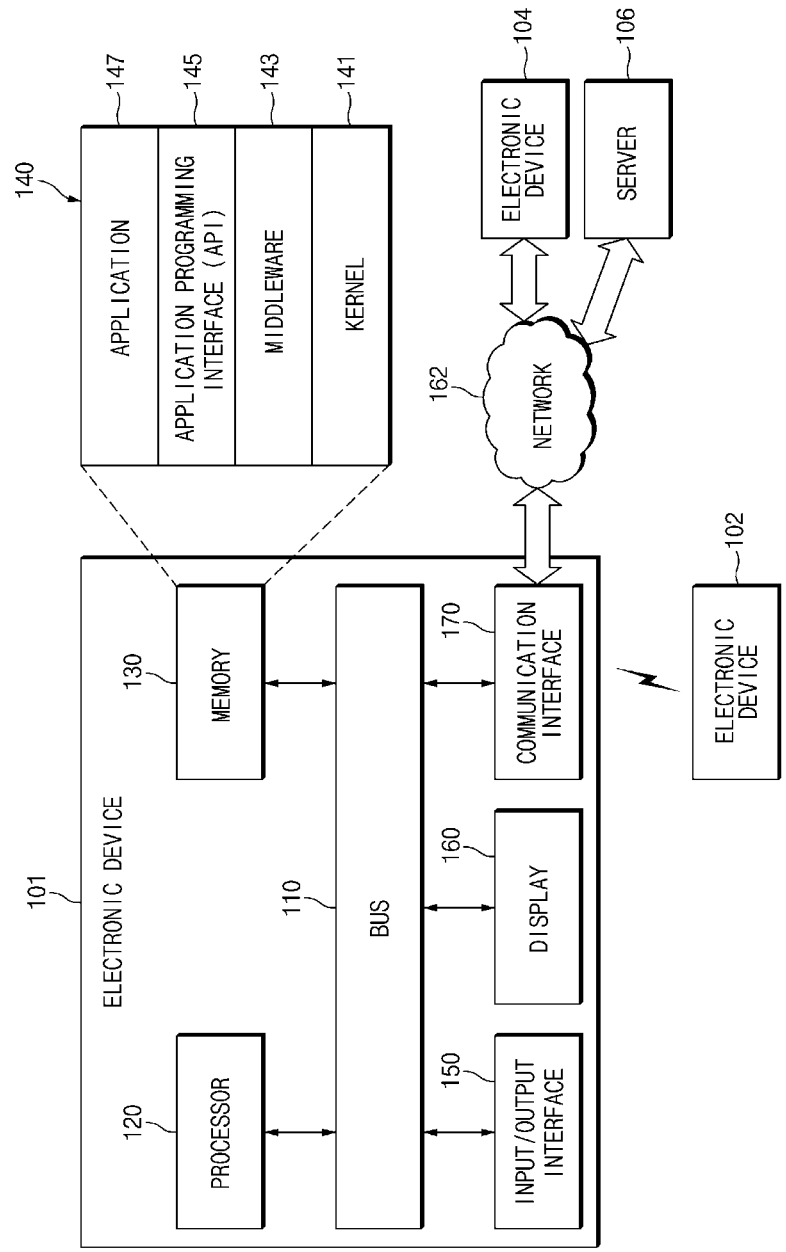
FIG. 1 is a block diagram illustrating a configuration of an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, the expressions "have", "may have", "include" and "comprise", or "may include" and "may comprise" used herein indicate existence of corresponding features (e.g., elements, such as numeric values, functions, operations, or components) but do not exclude presence of additional features.

In embodiments of the present disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions, such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" should not mean only "specifically designed to" be performed by a hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor (AP) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude various embodiments of the present disclosure.

Electronic devices, according to various embodiments of the present disclosure, may be electronic devices which control attributes of an object according to a user input, which will be below with reference to FIGS. 1 to 11. For example, the electronic devices may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group phase 1 or phase 2 (MPEG-1 or MPEG-2) audio layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, smart watches, and the like).

According to various embodiments of the present disclosure, the electronic devices may be smart home appliances which control attributes of an object according to a user input. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of various medical devices (e.g., various portable medical measurement devices (e.g., blood glucose meters, heart rate meters, blood pressure meters, thermometers, and the like), a magnetic resonance angiography (MRA), a magnetic resonance imaging (MRI), a computed tomography (CT), scanners, ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), each of which controls attributes of an object according to a user input.

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like), each of which controls attributes of an object according to a user input. According to various embodiments of the present disclosure, the electronic devices may be one or more combinations of the above-mentioned devices.

According to various embodiments of the present disclosure, the electronic devices may be flexible electronic devices which control attributes of an object according to a user input.

In addition, electronic devices according to various embodiments of the present disclosure are not limited to the above-mentioned devices, and may include new electronic devices according to technology development.

Hereinafter, electronic devices according to various embodiments of the present disclosure will be described with reference to the accompanying drawings. The term "user" used herein may refer to a person who uses an electronic device or may refer to a device (e.g., an artificial electronic device) which uses an electronic device.

FIG. 1 is a block diagram illustrating a configuration of an electronic device in a network environment according to various embodiments of the present disclosure.

Referring to FIG. 1, an electronic device 101 may include a bus 110, a processor 120, a memory 130, an input and output interface 150, a display 160, and a communication interface 170. According to various embodiments of the present disclosure, at least one of the elements may be omitted from the electronic device 101 or other elements may be added in the electronic device 101.

The bus 110 may include, for example, a circuit which connects the components 120 to 170 with each other and transmits communication (e.g., a control message and/or data) between the components.

The processor 120 may include one or more of a CPU, an AP, or a communication processor (CP). The processor 120 may perform, for example, calculation or data processing about control and/or communication of at least another of the components of the electronic device 101.

The memory 130 may include a volatile and/or non-volatile memory. The memory 130 may store, for example, instructions or data associated with at least another of the components of the electronic device 101. According to an embodiment of the present disclosure, the memory 130 may store software and/or a program 140. The program 140 may include, for example, a kernel 141, a middleware 143, an application programming interface (API) 145, and/or an application program 147 (or an "application"). At least a part of the kernel 141, the middleware 143, or the API 145 may be referred to as an operating system (OS).

The kernel 141 may control or manage, for example, system resources (e.g., the bus 110, the processor 120, the memory 130, and the like) used to execute an operation or function implemented in the other programs (e.g., the middleware 143, the API 145, or the application program 147). In addition, the kernel 141 may provide an interface which may control or manage system resources by accessing a separate component of the electronic device 101 in the middleware 143, the API 145, or the application program 147.

The middleware 143 may play a role as, for example, a go-between such that the API 145 or the application program 147 communicates with the kernel 141 and transmits and receives data. In addition, the middleware 143 may perform, for example, control (e.g., scheduling or load balancing) with respect to work requests using a method of providing priority, which may use system resources (the bus 110, the processor 120, or the memory 130, and the like) of the electronic device 101, to at least one of the application program 147, in connection with the work requests provided from the application program 147.

The API 145 may be, for example, an interface in which the application program 147 controls a function provided from the kernel 141 or the middleware 143. For example, the API 145 may include at least one interface or function (e.g., an instruction) for file control, window control, image processing, text control, and the like.

The input and output interface 150 may play a role as, for example, an interface which may transmit instructions or data input from a user or another external device to another component (or other components) of the electronic device 101. In addition, input and output interface 150 may output instructions or data received from another component (or other components) of the electronic device 101 to the user or the other external device.

The display 160 may include, for example, a liquid crystal display (LCD), a light emitting diode (LED) display, an organic LED (OLED) display, a microelectromechanical systems (MEMS) display, an electronic paper display, and the like. The display 160 may display, for example, various contents (e.g., a text, images, videos, icons, symbols, and the like) to the user. The display 160 may include a touch screen, and may receive, for example, a touch, a gesture, a proximity, a hovering input, and the like, using an electronic pen or a part of a body of the user.

The communication interface 170 may establish communication between, for example, the electronic device 101 and an external device (e.g., a first external electronic device 102, a second external electronic device 104, or a server 106). For example, the communication interface 170 may connect to a network 162 through wireless communication or wired communication and may communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. The wired communication may include at least one of, for example, a universal serial bus (USB), a high definition multimedia interface (HDMI), a recommended standard 232 (RS-232), a plain old telephone service (POTS), and the like. The network 162 may include a telecommunications network, for example, at least one of a computer network (e.g., a local area network (LAN) or a wide area network (WAN)), the Internet, a telephone network, and the like.

Each of the first external electronic device 102 and the second external electronic device 104 which may be the same or different device as or from the electronic device 101. According to an embodiment of the present disclosure, the server 106 may include a group of one or more servers. According to various embodiments of the present disclosure, all or some of operations executed in the electronic device 101 may be executed in another electronic device or a plurality of electronic devices (e.g., the first external electronic device 102, the second external electronic device 104, or the server 106). According to an embodiment of the present disclosure, when the electronic device 101 should perform any function or service automatically or according to a request, the electronic device 101 may request another device (e.g., the first external electronic device 102, the second external electronic device 104, or the server device 106) to perform at least a part of the function or service, rather than executing the function or service for itself or in addition to the function or service. The other electronic device (e.g., the first external electronic device 102, the second external electronic device 104, or the server device 106) may execute the requested function or the added function and may transmit the result of the execution to the electronic device 101. The electronic device 101 may process the received result without change or additionally and may provide the requested function or service. For this purpose, for example, cloud computing technologies, distributed computing technologies, or client-server computing technologies may be used.

Figure 2:
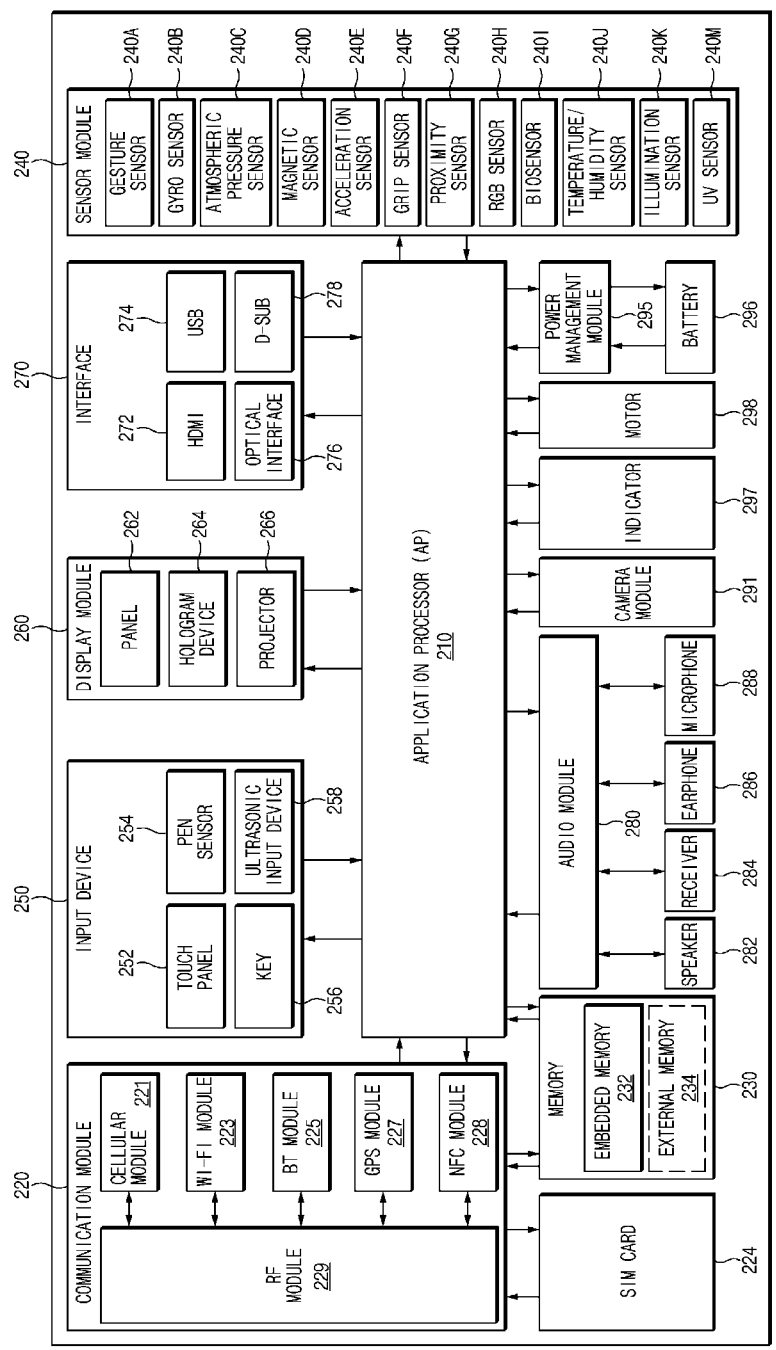
FIG. 2 is a block diagram illustrating a configuration of an electronic device according to various embodiments of the present disclosure.

FIG. 2 is a block diagram illustrating a configuration of an electronic device according to various embodiments of the present disclosure.

Referring to FIG. 2, an electronic device, for example, the electronic device 101, may include one or more APs 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may drive, for example, an OS or an application program to control a plurality of hardware or software components connected thereto and may process and compute a variety of data. The AP 210 may be implemented with, for example, a system on chip (SoC). According to an embodiment of the present disclosure, the AP 210 may further include a graphical processing unit (GPU) (not shown) and/or an image signal processor (not shown). The AP 210 may include at least some (e.g., a cellular module 221) of the components shown in FIG. 2. The AP 210 may load instructions or data received from at least one of other components (e.g., non-volatile memories) into a volatile memory to process the instructions or the data, and may store various data in a non-volatile memory.

The communication module 220 may have the same or similar configuration as or to that of the communication interface 170 of FIG. 1. The communication module 220 may include, for example, the cellular module 221, a Wi-Fi module 223, a Bluetooth (BT) module 225, a GPS module 227, a near field communication (NFC) module 228, and a radio frequency (RF) module 229.

The cellular module 221 may provide, for example, a voice call service, a video call service, a text message service, an Internet service, and the like, through a communication network. According to an embodiment of the present disclosure, the cellular module 221 may identify and authenticate the electronic device within a communication network using a SIM (e.g., the SIM card 224). According to an embodiment of the present disclosure, the cellular module 221 may perform at least some of functions which may be provided by the AP 210. According to an embodiment of the present disclosure, the cellular module 221 may include a CR The Wi-Fi module 223, the BT module 225, the GPS module 227, or the NFC module 228 may include, for example, a processor for processing data transmitted and received through the corresponding module. According to various embodiments of the present disclosure, at least some (e.g., two or more) of the cellular module 221, the Wi-Fi module 223, the BT module 225, the GPS module 227, or the NFC module 228 may be included in one integrated chip (IC) or one IC package.

The RF module 229 may transmit and receive, for example, a communication signal (e.g., an RF signal). The RF module 229 may include, for example, a transceiver (not shown), a power amplifier module (PAM) (not shown), a frequency filter (not shown), a low noise amplifier (LNA) (not shown), an antenna (not shown), and the like. According to another embodiment of the present disclosure, at least one of the cellular module 221, the Wi-Fi module 223, the BT module 225, the GPS module 227, or the NFC module 228 may transmit and receive an RF signal through a separate RF module.

The SIM card 224 may include, for example, a card which includes a SIM and/or an embedded SIM. The SIM 224 may include unique identification information (e.g., an integrated circuit card identifier (ICCID)) or subscriber information (e.g., an international mobile subscriber identity (IMSI)).

The memory 230 (e.g., the memory 130 of FIG. 1) may include, for example, an embedded memory 232 or an external memory 234. The embedded memory 232 may include at least one of, for example, a volatile memory (e.g., a dynamic random access memory (DRAM), a static RAM (SRAM), or a synchronous dynamic RAM (SDRAM), and the like), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a not and (NAND) flash or a not or (NOR) flash, and the like), a hard drive, or a solid state drive (SSD)).

The external memory 234 may further include a flash drive, for example, a compact flash (CF), a secure digital (SD), a micro-SD, a mini-SD, an extreme digital (xD), a memory stick, and the like. The external memory 234 may be functionally and/or physically connected with the electronic device through various interfaces.

The sensor module 240 may measure, for example, a physical quantity or may detect an operation state of the electronic device, and may convert the measured or detected information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biosensor 240I, a temperature/humidity sensor 240J, an illumination sensor 240K, or an ultraviolet (UV) sensor 240M. Additionally or alternatively, the sensor module 240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown). The sensor module 240 may further include a control circuit for controlling at least one or more sensors included therein. According to various embodiments of the present disclosure, the electronic device may further include a processor configured, as a part of the AP 210 or to be independent of the AP 210, to control the sensor module 240, and may control the sensor module 240 while the AP 210 is in a sleep state.

The input device 250 may include, for example, a touch panel 252, a (digital) pen sensor 254, a key 256, or an ultrasonic input unit 258. The touch panel 252 may use at least one of, for example, capacitive, resistive, IR, and ultrasonic detecting methods. In addition, the touch panel 252 may further include a control circuit. The touch panel 252 may further include a tactile layer, and may provide a tactile reaction to a user.

The (digital) pen sensor 254 may be, for example, a part of the touch panel 252 and may include a separate sheet for recognition. The key 256 may include, for example, a physical button, an optical key, a keypad, and the like. The ultrasonic input unit 258 may detect sound waves through a microphone (e.g., a microphone 288) of the electronic device and may verify data corresponding to the detected sound waves, using an input implement which generates ultrasonic waves.

The display module 260 (e.g., the display 160 of FIG. 1) may include a panel 262, a hologram device 264, or a projector 266. The panel 262 may include the same or similar configuration as or to that of the display 160. The panel 262 may be implemented to be, for example, flexible, transparent, wearable, and the like. The panel 262 and the touch panel 252 may be integrated into one module. The hologram device 264 may show a stereoscopic image in a space using interference of light. The projector 266 may project light onto a screen to display an image. The screen may be positioned for example, inside or outside the electronic device. According to an embodiment of the present disclosure, the display module 260 may further include a control circuit for controlling the panel 262, the hologram device 264, or the projector 266.

The interface 270 may include, for example, an HDMI 272, a USB 274, an optical interface 276, or a D-subminiature 278. The interface 270 may be included in, for example, a communication interface 170 shown in FIG. 1. Additionally or alternatively, the interface 270 may include, for example, a mobile high definition link (MHL) interface, an SD card/multimedia card (MMC) interface, an infrared data association (IrDA) standard interface, and the like.

The audio module 280 may convert, for example, a sound and an electric signal in dual directions. At least some of components of the audio module 280 may be included in, for example, an input and output interface 150 shown in FIG. 1. The audio module 280 may process sound information input or output through, for example, a speaker 282, a receiver 284, an earphone 286, or the microphone 288, and the like.

The camera module 291 may be, for example, a device which captures a still picture and a moving picture. According to an embodiment of the present disclosure, the camera module 291 may include one or more image sensors (not shown) (e.g., a front sensor or a rear sensor), a lens (not shown), an ISP (not shown), or a flash (not shown) (e.g., an LED or a xenon lamp).

The power management module 295 may manage, for example, power of the electronic device. According to an embodiment of the present disclosure, the power management module 295 may include a power management integrated circuit (PMIC) (not shown), a charger IC (not shown), or a battery or fuel gauge (not shown). The PMIC may perform a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 296 and voltage, current, or temperature thereof while the battery 296 is charged. The battery 296 may include, for example, a rechargeable battery and/or a solar battery.

The indicator 297 may display a specific state of the electronic device or a part (e.g., the AP 210) thereof, for example, a booting state, a message state, a charging state, and the like. The motor 298 may convert an electric signal into mechanical vibration, and may generate vibration or a haptic effect, and the like. Though not shown, the electronic device may include a processing unit (e.g., a GPU) for supporting a mobile TV. The processing unit for supporting the mobile TV may process media data according to the standard of, for example, digital multimedia broadcasting (DMB), digital video broadcasting (DVB), or MediaFlo™, and the like.

Each of the above-mentioned elements of the electronic device described herein may be configured with one or more components, and names of the corresponding elements may be changed according to the type of the electronic device. According to various embodiments of the present disclosure, the electronic device may include at least one of the elements described herein, some elements may be omitted from the electronic device, or other additional elements may be further included in the electronic device. In addition, some of the elements of the electronic device according to various embodiments of the present disclosure may be combined with each other to form one entity, thereby making it possible to perform the functions of the corresponding elements in the same manner as before the combination.

Figure 3:
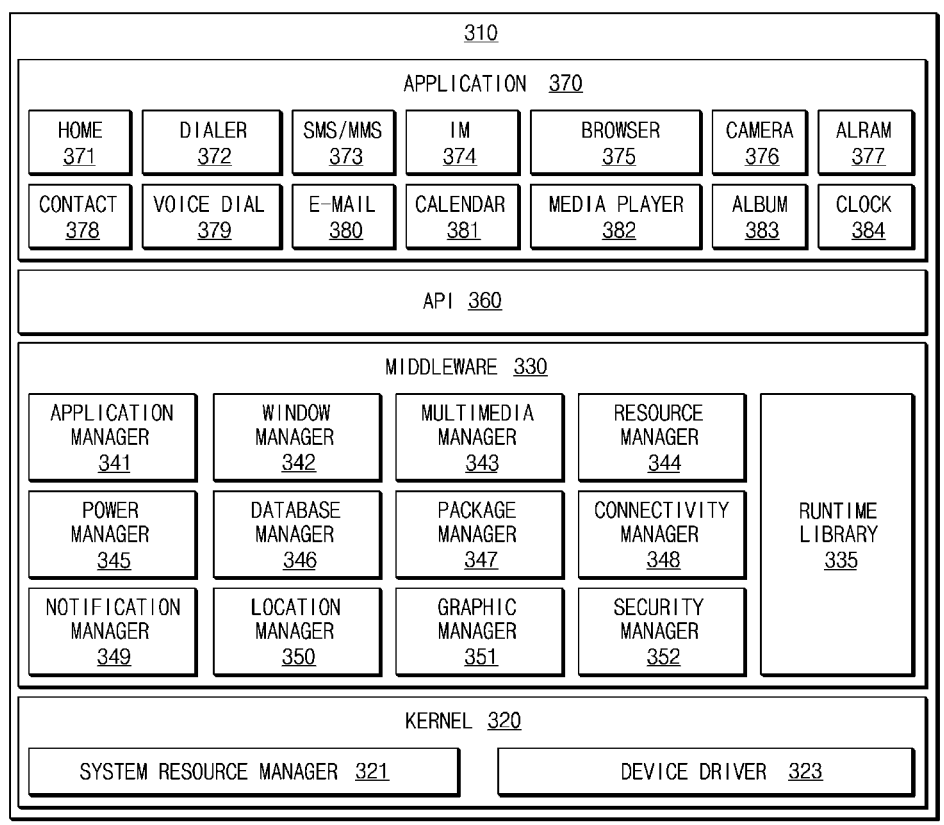
FIG. 3 is a block diagram illustrating a configuration of a program module according to various embodiments of the present disclosure.

FIG. 3 is a block diagram illustrating a configuration of a program module according to various embodiments of the present disclosure.

Referring to FIG. 3, according to an embodiment of the present disclosure, a program module 310 (e.g., the program 140 of FIG. 1) may include an OS for controlling resources associated with an electronic device (e.g., the electronic device 101 of FIG. 1) and/or various applications (e.g., the application program 147 of FIG. 1) which are executed on the OS. The OS may be, for example, Android, iOS, Windows, Symbian, Tizen, or Bada, and the like.

The program module 310 may include a kernel 320, a middleware 330, and an API 360, and/or an application 370. At least a part of the program module 310 may be preloaded on the electronic device, or may be downloaded from a server (e.g., the server 106 of FIG. 1).

The kernel 320 (e.g., the kernel 141 of FIG. 1) may include, for example, a system resource manager 321 or a device driver 323. The system resource manager 321 may control, assign, or collect, and the like system resources. According to an embodiment of the present disclosure, the system resource manager 321 may include a process management unit, a memory management unit, a file system management unit, and the like. The device driver 323 may include, for example, a display driver, a camera driver, a BT driver, a shared memory driver, a USB driver, a keypad driver, a Wi-Fi driver, an audio driver, an inter-process communication (IPC) driver, and the like.

The middleware 330 may provide, for example, functions the application 370 needs in common, and may provide various functions to the application 370 through the API 360 such that the application 370 efficiently uses limited system resources in the electronic device. According to an embodiment of the present disclosure, the middleware 330 (e.g., the middleware 143 of FIG. 1) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module used by a compiler to add a new function through a programming language while the application 370 is executed. The runtime library 335 may perform a function about input and output management, memory management, or an arithmetic function.

The application manager 341 may manage, for example, a life cycle of at least one of the application 370. The window manager 442 may manage graphic user interface (GUI) resources used on a screen of the electronic device. The multimedia manager 343 may ascertain a format necessary for reproducing various media files and may encode or decode a media file using a codec corresponding to the corresponding format. The resource manager 344 may manage source codes of at least one of the application 370, and may manage resources of a memory or a storage space, and the like.

The power manager 345 may act together with, for example, a basic input/output system (BIOS) and the like, may manage a battery or a power source, and may provide power information necessary for an operation of the electronic device. The database manager 346 may generate, search, or change a database to be used in at least one of the application 370. The package manager 347 may manage installation or update of an application distributed by a type of a package file.

The connectivity manager 348 may manage, for example, a wireless connection, such as a Wi-Fi connection or a BT connection, and the like. The notification manager 349 may display or notify events, such as an arrival message, an appointment, and proximity notification, by a method which is not disturbed to the user. The location manager 350 may manage location information of the electronic device. The graphic manager 351 may manage a graphic effect to be provided to the user or a user interface (UI) related to the graphic effect. The security manager 352 may provide all security functions necessary for system security or user authentication, and the like. According to an embodiment of the present disclosure, when the electronic device (e.g., the electronic device 101) has a phone function, the middleware 330 may further include a telephony manager (not shown) for managing a voice or video communication function of the electronic device.

The middleware 330 may include a middleware module which configures combinations of various functions of the above-described components. The middleware 330 may provide a module which specializes according to kinds of OSs to provide a differentiated function. In addition, the middleware 330 may dynamically delete some of old components or may add new components.

The API 360 (e.g., the API 145 of FIG. 1) may be, for example, a set of API programming functions, and may be provided with different components according to OSs. For example, in case of Android or iOS, one API set may be provided for each platform. In case of Tizen, two or more API sets may be provided for each platform.

The application 370 (e.g., the application program 147) may include one or more of, for example, a home application 371, a dialer application 372, an SMS/MMS application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring quantity of exercise or blood sugar, and the like), or an environment information application (e.g., an application for providing atmospheric pressure information, humidity information, temperature information, and the like), and the like.

According to an embodiment of the present disclosure, the application 370 may include an application (hereinafter, for better understanding and ease of description, referred to as an "information exchange application") for exchanging information between the electronic device (e.g., the electronic device 101) and an external electronic device (e.g., the first external electronic device 102 and the second external electronic device 104 of FIG. 1). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, the environment information application, and the like) of the electronic device, to the external electronic device (e.g., the first external electronic device 102 and the second external electronic device 104). In addition, the notification relay application may receive, for example, notification information from the external electronic device, and may provide the received notification information to the user of the electronic device. The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the electronic device 104) which communicates with the electronic device, an application which operates in the external electronic device, or a service (e.g., a call service or a message service) provided from the external electronic device.

According to an embodiment of the present disclosure, the application 370 may include an application (e.g., the health care application when each of the first external electronic device 102 and the second external electronic device 104 is a mobile medical device) which is preset according to an attribute of the external electronic device (e.g., the first external electronic device 102 and the second external electronic device 104). According to an embodiment of the present disclosure, the application 370 may include an application received from the external electronic device (e.g., the server 106 or the first external electronic device 102 and the second external electronic device 104). According to an embodiment of the present disclosure, the application 370 may include a preloaded application or a third party application which may be downloaded from a server. Names of the components of the program module 310 according to various embodiments of the present disclosure may differ according to kinds of OSs.

According to various embodiments of the present disclosure, at least a part of the program module 310 may be implemented with software, firmware, hardware, or at least two or more combinations thereof At least a part of the program module 310 may be implemented (e.g., executed) by, for example, a processor (e.g., an AP 210 of FIG. 2). At least a part of the program module 310 may include, for example, a module, a program, a routine, sets of instructions, a process, and the like for performing one or more functions.

Figure 4:
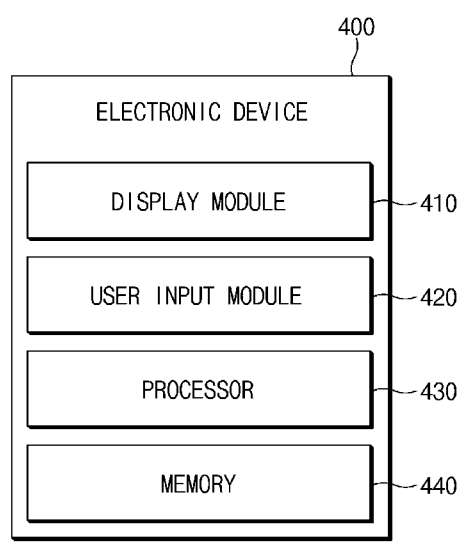
FIG. 4 is a block diagram illustrating a configuration of an electronic device for displaying an object effect according to a user input according to various embodiments of the present disclosure.

FIG. 4 is a block diagram illustrating a configuration of an electronic device for displaying an object effect according to a user input according to various embodiments of the present disclosure.

Referring to FIG. 4, an electronic device 400 may include a display module 410, a user input module 420, a processor 430, and a memory 440. Herein, the electronic device 400 shown in FIG. 4 may be only an implementation example. Various modifications are possible according to the elements shown in FIG. 4. For example, the electronic device 400 may further include UIs, such as a keyboard and a mouse, for receiving any instruction or information from a user of the electronic device 400.

The display module 410 may be, for example, a touch screen panel (TSP) module and may include at least one touch sensor and display screen. The at least one touch sensor and display screen may be a TSP and may be included in the electronic device 400. For example, the display module 410 may be include at least the same or similar configuration as or to that of a display module 260 shown in FIG. 2.

The display module 410 may display at least one or more objects on a screen (e.g., the display screen). The objects may be objects which are independently controlled through a user input and may have various attributes (types). For example, the objects may include a menu object, an image object, a figure object, a note object, a drawing object, a layer object including a plurality of objects, and the like. The objects may be displayed through an image editing application or a memory application executed by the processor 430. Hereinafter, it is assumed that the image editing application or the memory application, and the like are executed.

The user input module 420 may receive a user input from the user. Herein, the user input module 420 may be included in the display module 410. Alternatively, the user input module 420 may correspond to at least some of the elements included in an input and output interface 150 shown in FIG. 1.

The user input may include, for example, a touch input on the screen using fingers or a stylus, such as an S-pen of the user. The touch input may mean a state where a finger or stylus is in physical contact with a screen of the electronic device 400.

However, a user input according to various embodiments of the present disclosure may be implemented when the finger or stylus is not in contact with the screen, according to characteristics supported by the screen or the electronic device 400. For example, when a finger is close to a predetermined distance from the screen, the electronic device 400 may detect an amount of a change in an electromagnetic field by the finger. The user input module 420 may determine whether a user input (e.g., a hover input) occurs, using the detected amount of the change. In a similar manner, the user input module 420 may determine that a touch input occurs when a stylus is close to the screen.

According to various embodiments of the present disclosure, the user input module 420 may receive a motion-based user input using a sensor (e.g., a gesture sensor 240A of FIG. 2). For example, the user input module 420 may recognize an operation, in which the user moves his or her hand, as touch move.

The user input module 420 may determine a state of the user input. For example, the user input module 420 may determine a touch-down, a touch a drag, and a touch release of the user input by continuously tracking the user input.

The processor 430 may include, for example, at least the same or similar configuration as or to that of a processor 120 shown in FIG. 1. The processor 430 may compare a coordinate of the object with a coordinate of the user input. When the coordinate of the object corresponds to the coordinate of the user input, the processor 430 may control attributes of the object. In this case, while the coordinate of the object is fixed, a predetermined effect may be displayed. The coordinate of the object may be obtained from the executed application or the memory 440. In addition, the coordinate of the user input may be obtained from the user input module 420.

When a user input (e.g., a touch drag) moves on the screen, the processor 430 may calculate (measure) a distance in which the user input moves and time required for moving the corresponding distance. Therefore, the processor 430 may identify purposes of the user input.

For example, a movement distance per unit time of the user input is greater than or equal to a threshold value, the processor 430 may inactivate the object for the user input. In contrast, when the movement distance per unit time of the user input is less than the threshold value, the processor 430 may determine the user input as a long press and may select the object through the user input.

When a current coordinate of the user input corresponds to a coordinate of the object, the processor 430 may determine whether a touch-down event of the user input occurs on the object. For example, as a result of the determination, after the touch-down event of the user input occurs outside the object, when a current coordinate of the user input corresponds to a coordinate of the object through touch drag, the processor 430 may determine the user input as a user input for drawing a picture or a user input for writing, and the like. In contrast, when the touch-down event of the user input occurs on the object, the processor 430 may determine the user input as a user input for selecting the object. Herein, the determination of the processor 430 may be determined based on a movement distance per unit time of the user input.

The processor 430 may adjust a transparency of the object using a predetermined effect on the object. For example, a nontransparent object may be a semitransparent or transparent object.

When there are a plurality of objects, the processor 430 may adjust priorities of the objects. The priorities may refer to a display order in a normal direction (e.g., a direction from a screen to a user who sees the screen) of the screen. In other words, the priorities may refer to an overlapped order of overlapped objects.

In addition, the processor 430 may display different effects for each attribute (kind) of the object. For example, the predetermined effect may be stored in the memory 440 to differ from each other for each attribute of the object.

According to various embodiments of the present disclosure, the predetermined effect on the object, which is displayed by the processor 430, may be temporary. For example, when a coordinate of the user input no longer corresponds to a coordinate of the object, a transparent object may be nontransparent again.

As described above, the object may be for the executed image editing application or the executed memo application, and the like. Therefore, when the image editing application or the memory application is not executed, the processor 430 may be programmed not to display the predetermined effect.

To sum up, the processor 430 may control attributes of an object through an operation of activating the object to select the object, an operation of inactivating the object not to select the object, an operation of controlling a transparency of the object, or an operation of adjust the overlapped order of two or more overlapped objects.

In addition, the processor 430 may control attributes of the object according to at least one or more of states of the user input including a touch-down, a touch move, and a touch release, a movement speed of the user input, a tilt of an input tool of the user input, pressure of the user input, whether the input tool rotates, whether the user input is a touch input or a hover input, or whether a started position of the user input is within a region of the object. Herein, rotation of the user input may refer to rotation of a stylus when the user rotates the stylus.

The memory 440 may store data. The memory 440 may include, for example, at least the same or similar as or to that of the memory 130 shown in FIG. 1. In this case, the data stored in the memory 440 may include data input and output between respective components inside the electronic device 400 and may include data input and output between components outside the electronic device 400. For example, the memory 440 may store coordinate information, movement distance information, and movement time information with respect to a user input received by the user input module 420. In addition, the memory 440 may store a predetermined effect for each attribute of the object.

This memory 440 may include a hard disc drive, a ROM, a RAM, a flash memory, a memory card, and the like inside or outside the electronic device 400.

It should be well understood to those skilled in the art that the display module 410, the user input module 420, the processor 430, and the memory 440 may be implemented to be independent of each other or may be implemented such that one or more of them are integrated into one device.

Hereinafter, a description will be given of various operations performed in the processor 430 with reference to FIGS. 5A to 10.

Figure 5A:
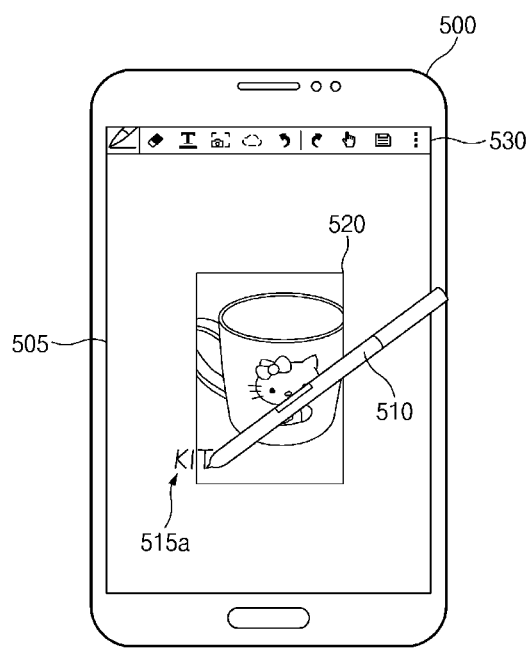
FIG. 5A illustrates a method for inputting text on an image object according to various embodiments of the present disclosure.
Figure 5B:
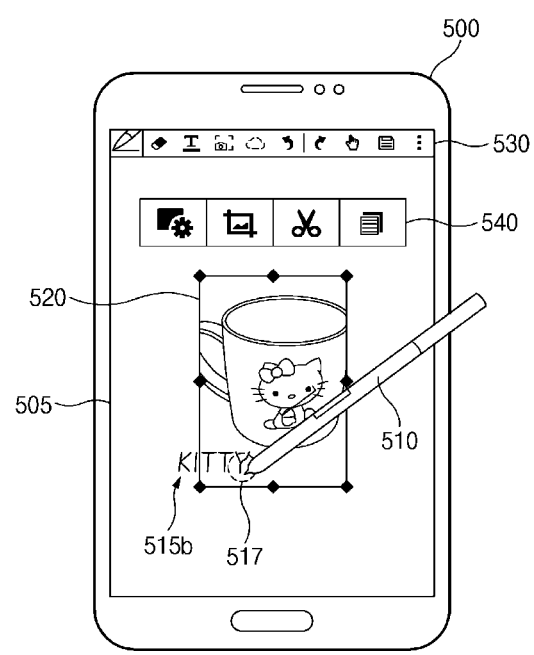
FIG. 5B illustrates a method for selecting an image object according to various embodiments of the present disclosure.

FIG. 5A illustrates a method for inputting text on an image object according to various embodiments of the present disclosure. FIG. 5B illustrates a method for selecting an image object according to various embodiments of the present disclosure.

Referring to FIG. 5A, an electronic device 500 may display an image object 520 on a screen 505 through a specific application. A menu object 530 may be an object which collects functions used by the specific application.

A user of the electronic device 500 may generate a note object 515a by inputting 'KIT' (note object) on the screen 505. Since a 'KI' portion of the 'KIT' is placed outside the image object 520, there is no problem in the 'KI' portion. Herein, since a 'T' portion of the 'KIT' is placed on the image object 520, when the user moves a stylus 510 on the image object 50 (or when the stylus 510 is directly touched down on the image object 520) to write 'T', a processor 430 of FIG. 4 may determine whether a user input makes any instruction. As the standard of the determination, the processor 430 may use a movement distance per unit time of the user input.

Referring to FIG. 5A, when a movement distance per unit time when the user writes 'T' on the screen 505 is greater than or equal to a threshold value, the processor 430 may determine the user input as a user input for writing. Therefore, despite the user input which is touched down on the image object 520, the processor 430 may inactivate (e.g., may not select) the image object 520. When the movement distance per unit time when the user writes the 'T' on the screen 505 is less than the threshold value, the processor 430 may determine the user input as a user input for selecting the image object 520.

Referring to FIG. 5B, a note object 515b including 'KITTY' may be displayed on the screen 505. In addition, 'TTY' of the 'KITTY' may be displayed on the image object 520. The user may input the 'KITTY' using the stylus 510 and may long-presses the stylus 510 on a point where he or she inputs 'Y' without touch release.

The stylus 510 may moves at a predetermined distance from the position due to a shake and the like. However, when a movement distance per unit time is less than the threshold value, the processor 430 may determine the user input as a user input for selecting the image object 520. For example, when the user input does not depart from a region 517 during a unit time, the processor 430 may determine the user input as the user input for selecting the image object 520. When the user input departs from the region 517 during the unit time, the processor 430 may inactivate the image object 520 and may write additional letters according to the user input. As described above, movement of the user input may include a drag of a hover input as well as a drag of a physical touch input.

Therefore, the image object 520 may be selected according to the user input, and a plurality of indicators ♦, which display that the image object 520 is selected, may be displayed on edges of the image objects 520. In addition, a new menu object 540 which may edit the image object 520 may be displayed on the screen 505.

Figure 5C:
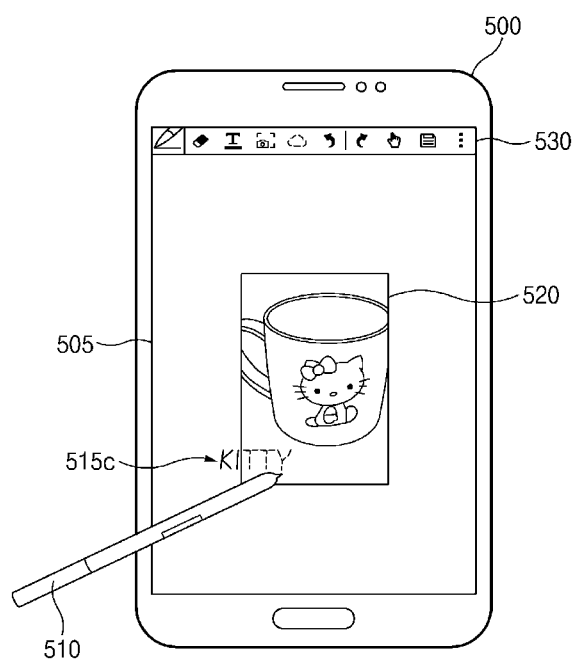
FIG. 5C illustrates a relationship between a drawing object and an image object according to attributes of a user input according to various embodiments of the present disclosure.

FIG. 5C illustrates a relationship between a drawing object and an image object according to attributes of a user input according to various embodiments of the present disclosure.

Referring to FIG. 5C with FIG. 5A, a direction of a stylus 510 is opposite to each other.

As described above, the processor 430 may generate a note object 515c including 'KITTY' according to the user input. Herein, when at least parts of the note object 515c and an image object 520 are overlapped, there may be a problem in the overlapped order (the top and the bottom) of the note object 515c and the image object 520.

According to various embodiments of the present disclosure, the processor 430 may perform an operation of determining the order of the filter object 515c and the image object 520 according to a tilted direction of a stylus 510. The operation may be intuitively determined. For example, it is assumed that the stylus 510 is a pen and the image object 520 is a photo. Since a pen point has a tilt, due to a direction of a stylus 510 shown in FIG. 5A, the pen point may ascend on the photo using the tilt. In contrast, due to a direction of the stylus 510 shown in FIG. 5C, the pen point may be touched to the photo each other and the photo may ascend over a support (penholder) of the pen. Therefore, in FIG. 5A, the note object 515a generated by the processor 430 may be displayed on the image object 520. Referring to FIG. 5C, the note object 515c may be displayed under the image object 520. Since 'TTY' in FIG. 5C is displayed under the image object 520, when a transparency of the image object 520 is 0%, the user may not see the 'TTY'. Therefore, the 'TTY' may be indicated as a dotted line to display that the 'TTY' is located under the image object 520.

Figure 6:
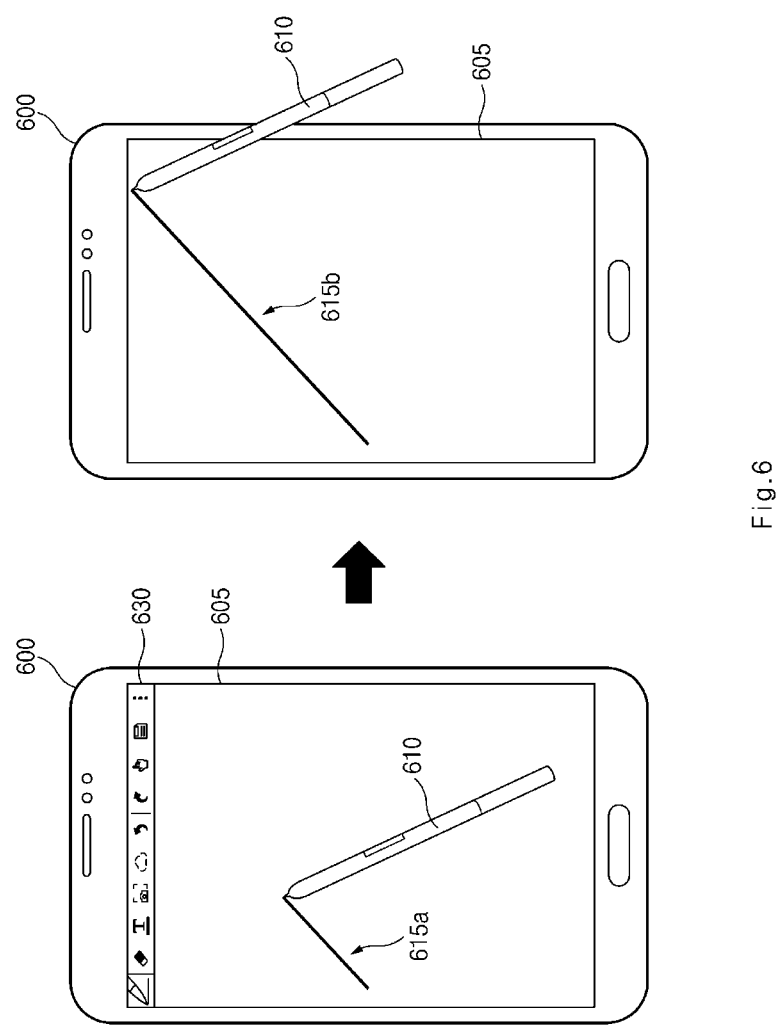
FIG. 6 illustrates a method for adjusting a transparency of a menu object according to a user input according to various embodiments of the present disclosure.

FIG. 6 illustrates a method for adjusting a transparency of a menu object according to a user input according to various embodiments of the present disclosure.

Referring to FIG. 6, a user input 610 is touched down on a screen 605 of an electronic device 600 to generate drawing objects 615a and 615b and may be touch-dragged on a menu object 630.

When a coordinate of the user input 610 corresponds to a coordinate of the menu object 630, a processor 430 of FIG. 4 may make the menu object 630 have a transparency of 100%. Herein, although the menu object 630 has the transparency of 100%, since the menu object 630 does not disappear from a corresponding position, the processor 430 may make the menu object 630 have the transparency of 100% with the menu object 630 inactivated not to select the menu object 630.

Herein, the inactivation of the menu object 630 may be determined according to a movement distance per unit time of the user input 610. Therefore, when the movement distance per unit time of the user input 610 is less than a threshold value, the processor 430 may perform an operation mapped to one icon on the menu object 630 corresponding to a coordinate of the user input 610.

According to various embodiments of the present disclosure, the processor 430 may not adjust the transparency of the menu object 630 and may perform only an operation of inactivating the menu object 630. In addition, the processor 430 may temporarily remove the menu object 630. For example, when the user input 610 departs from a coordinate of the menu object 630, or when the user input is touch-released, a hidden menu object 630 may be seen again.

FIG. 6 illustrates the operation performed between the drawing object 615b and the menu object 630. The scope and sprit of the present disclosure may not be limited thereto. For example, in case of a user input for selecting and moving an image object (not shown), the image object and the menu object 630 may be overlapped by the user input (although the user input does not ascend on the menu object 630). In this case, the processor 430 may make the menu object 630 have the transparence of 100% with the menu object 630 inactivated not to select the menu object 630.

Figure 7:
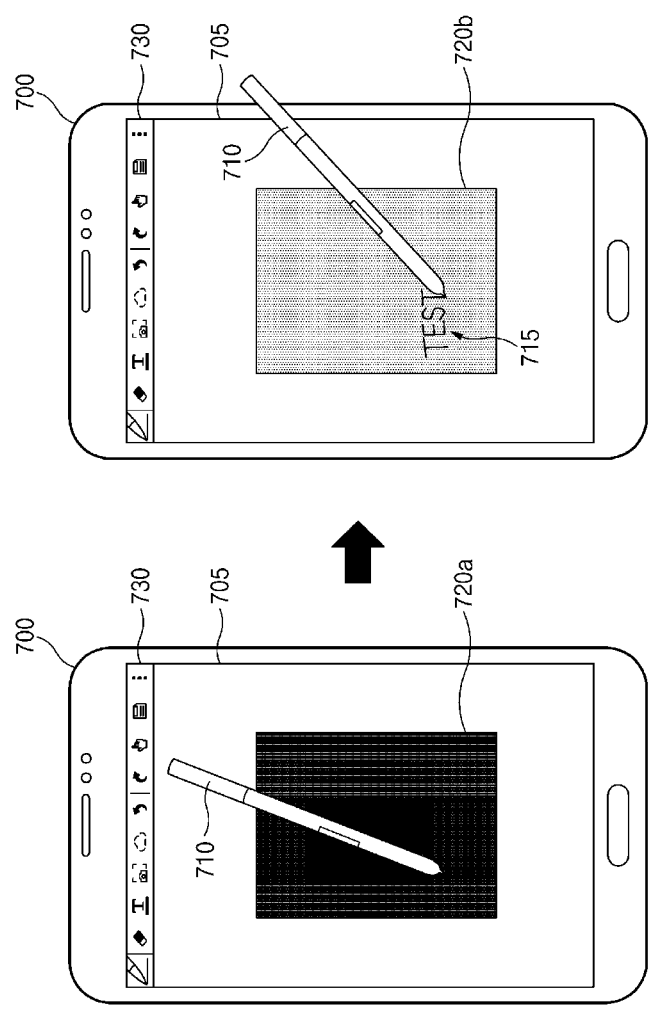
FIG. 7 illustrates a method for adjusting a color of an image object according to a user input according to various embodiments of the present disclosure.

FIG. 7 illustrates a method for adjusting a color of an image object according to a user input according to various embodiments of the present disclosure.

Referring to FIG. 7, when the letters 'test' are written on a screen 705 of an electronic device 700 by a user input 710, a processor 430 of FIG. 4 may generate a note object 715 according to the user input 710 which may be touch-dragged on a menu object 730. In this case, the processor 430 may change a color of an image object 720a to a color of the image object 720b according to the user input 710. For example, when a font color selected by a user is red, the processor 430 may change a color of the image object 720a to a blue color which is a complementary color of the red color. To have a complementary relationship between the image object 720a and a font color corresponding to the user input 710 may correspond to, but is not limited to, some of various embodiments of the present disclosure.

In addition, according to various embodiments of the present disclosure, the processor 430 may enhance a transparency of the image object 720a according to the user input 710. In this case, the adjusted transparency of the image object 720a may be continuous without being temporary. This is because the note object 715 may not be seen when the transparency of the image object 720a is adjusted again.

Figure 8:
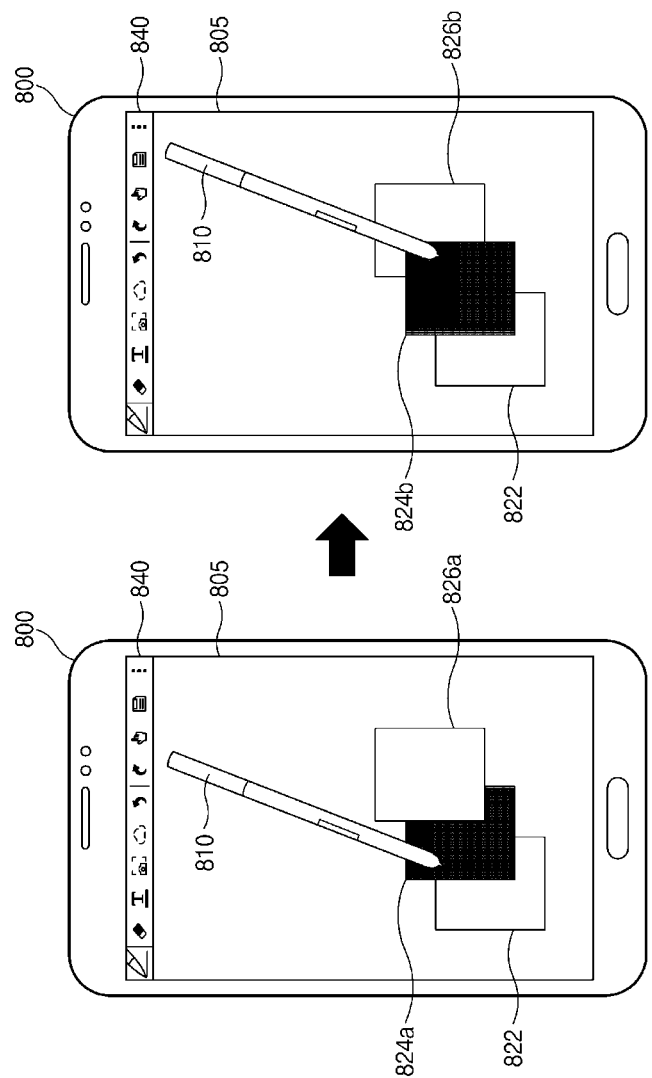
FIG. 8 illustrates a method for adjusting an order of image objects according to a user input according to various embodiments of the present disclosure.

FIG. 8 illustrates a method for adjusting an order of image objects according to a user input according to various embodiments of the present disclosure.

Referring to a drawing shown in the left of FIG. 8, each of image objects 822, 824a, and 826a may be displayed on a screen 805 of an electronic device 800. The overlapped order of the image objects 822, 824a, and 826a may be the image object 826a which is placed on the top, the image object 824a which is placed on the middle, and the image object 822 which is placed on the bottom.

In this case, referring to a drawing shown in the right of FIG. 8, the processor 430 of FIG. 4 may overlap an image object 824b corresponding to a coordinate of the user input 810 on an image object 826b according to the coordinate of a user input 810 which may be touch-dragged on a menu object 840. When a movement distance per unit time of the user input 810 is less than a threshold value, a predetermined effect may be performed through the processor 430.

When the movement distance per unit time of the user input 810 is greater than or equal to the threshold value, the processor 430 may inactivate the image object 824b and may generate a drawing object according to the user input 810. In this case, as shown in FIG. 7, a transparency of the image object 824b may be adjusted.

According to various embodiments of the present disclosure, after a drawing object or a note object is generated, when the image object 826b is selected again, the order of the image object 826b may be adjusted to be overlapped on the image object 824b. In this case, the processor 430 may adjust a transparency of the image object 826b such that the generated drawing object or note object is not hidden by the image object 826b.

Figure 9A:
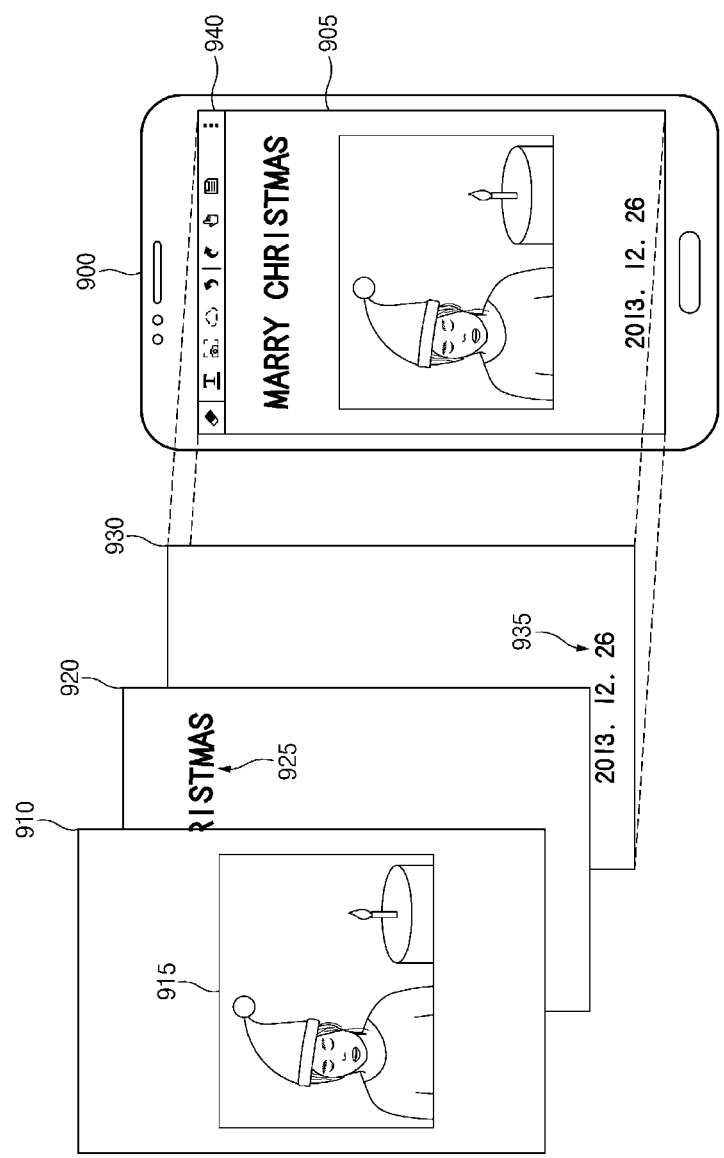
FIGS. 9A, 9B, and 9C illustrate a method for adjusting an order of layers including image objects according to a user input according to various embodiments of the present disclosure.
Figure 9B:
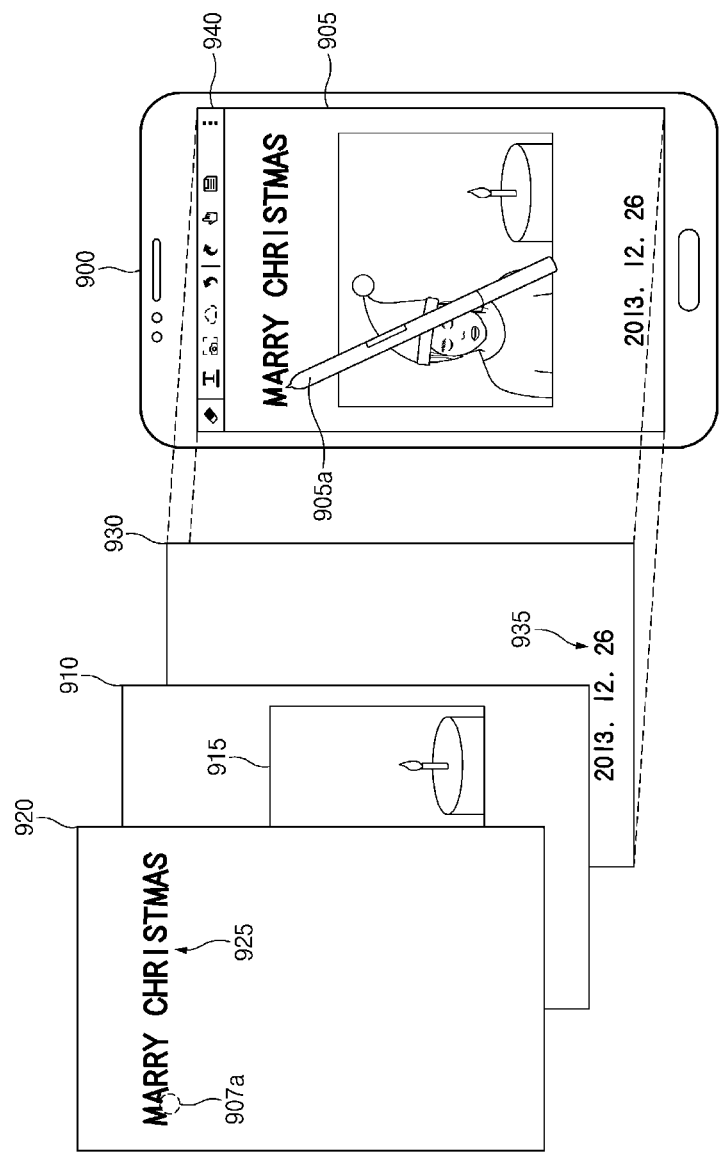
Figure 9C:
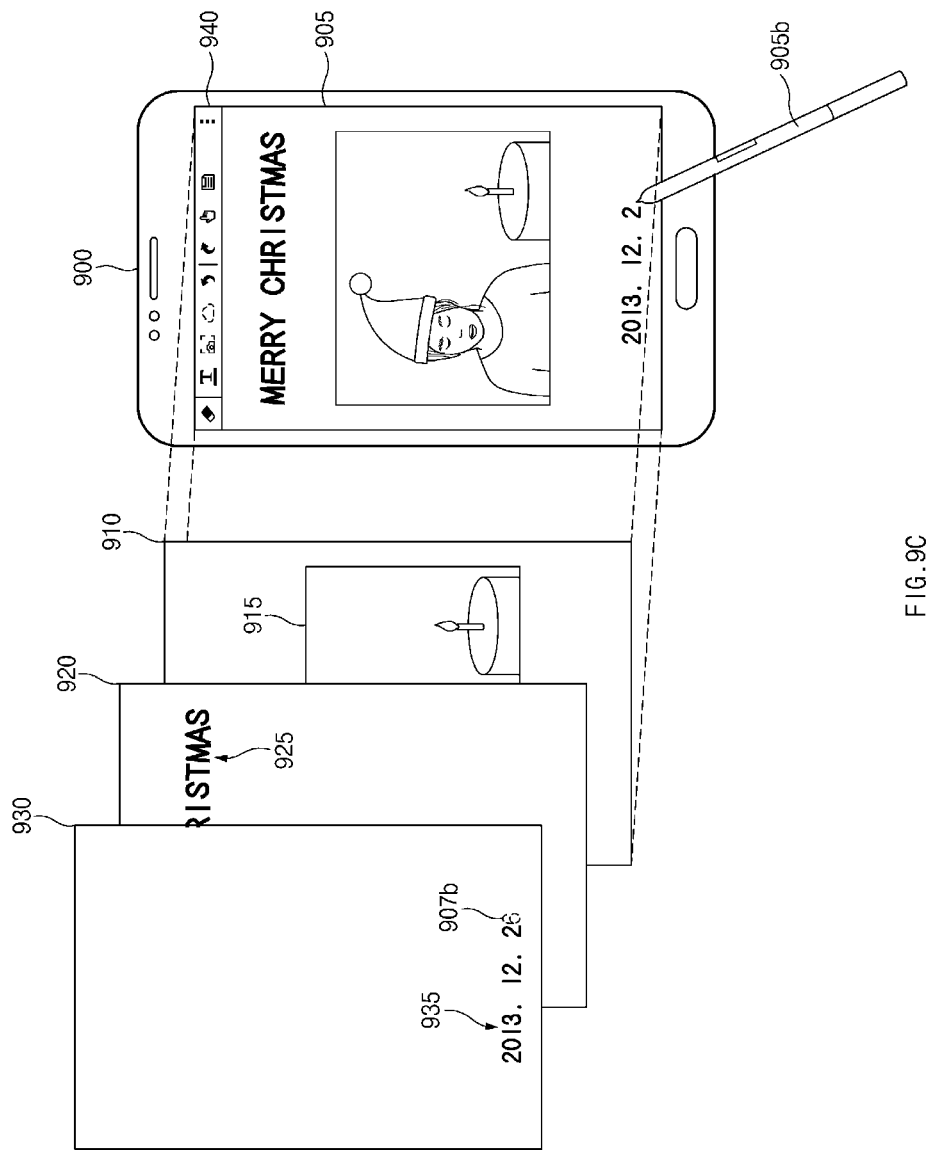

FIGS. 9A, 9B, and 9C illustrate a method for adjusting an order of layer objects including image objects according to a user input according to various embodiments of the present disclosure.

Referring to FIG. 9A, first to third layers 910, 920, and 930 may be displayed in order on a screen 905 of an electronic device 900. An image object 915 may be displayed on the first layer 910, and the remaining region may be a transparent region. In the same manner, the second layer 920 may include a first note object 925, and the third layer 930 may include a second note object 935. Comparing a first note object 925 with a second note object 935, although it is clearly shown in FIG. 9A, it is assumed that the first note object 925 is generated according to a user input corresponding to a brush and the second note object 935 is generated according to a user input corresponding to a ballpoint pen. The user input corresponding to the brush may be bitmap attributes, and the user input corresponding to the ballpoint pen may be vector attributes.

Referring to FIG. 9B, a user input 905a is placed on the first note object 925 included in the second layer 920. A processor 430 of FIG. 4 may adjust the order of the first layer 910 and the second layer 920 to place the second layer 920 on the first layer 910, according to the user input 905*a* which is located on the first note object 925*a* or the second layer 920. In addition, referring to a menu object 940, since the user input 905*a* corresponds to an eraser, the user input 905*a* may be to correct at least a part (e.g., 'A' of 'MARRY', which is misspelled) of the first note object 925. As described above, since the first note object 925 has the bitmap attributes, the processor 430 may set attributes of the eraser to a bitmap eraser. Therefore, at least a part of the first note object 925 may be erased as much as a bitmap eraser region 907*a* according to the user input 905*a*. In addition, as the user input 905*a* moves on the first note object 925, a region on the first note object 925, corresponding to a trajectory of the user input 905*a*, may be erased.

Referring to FIG. 9C, a user input 905*b* may be located on the second note object 935 included in the third layer 930. The processor 430 may adjust the order of the second layer 920 and the third layer 930 to place the third layer 930 on the second layer 920, according to the user input 905*b* which is located on the second note object 935 or the third layer 930. In addition, referring to the menu object 940, because the user input 905*b* corresponds to an eraser, the user input 905*b* may be to correct at least a part (e.g., '6' of 26, which is incorrectly written) of the second note object 935. As described above, since the second note object 935 has vector attributes, the processor 430 may set attributes of the eraser to a vector eraser. The vector eraser may erase a region by one stroke once without erasing the region as much as a region of a specified size to differ from a bitmap eraser. Therefore, at least a part '6' 907*b* of the second note object 935 on which the user input 905*b* is located may be erased by the vector eraser, according to the user input 905*b*.

According to various embodiments of the present disclosure, in addition to when a layer is selected by selecting an object through a user input, one layer may be selected by another method. For example, when a brush is selected as an input tool on the menu object 940, the processor 430 may select the first note object 925 corresponding to the brush. Similarly, when a ballpoint pen is selected as an input tool on the menu object 940, the processor 430 may select the second note object 935 corresponding to the ballpoint pen.

According to various embodiments of the present disclosure, the note object and the drawing object correspond to each other. Although the terminologies are exchanged with each other, the note object and the drawing object may be applied in common to various embodiments of the present disclosure.

In addition, the embodiment shown in FIGS. 9A to 9C is to the layer object which may include the plurality of objects to differ from the various embodiments shown in FIGS. 5A to 8. Although it is not shown in FIGS. 9A to 9C, according to various embodiments of the present disclosure, one layer may include a plurality of objects. In this case, when the layer is selected and when there is a user input for moving the layer, the processor 430 may move a plurality of objects, included in the one layer, once.

Figure 10:
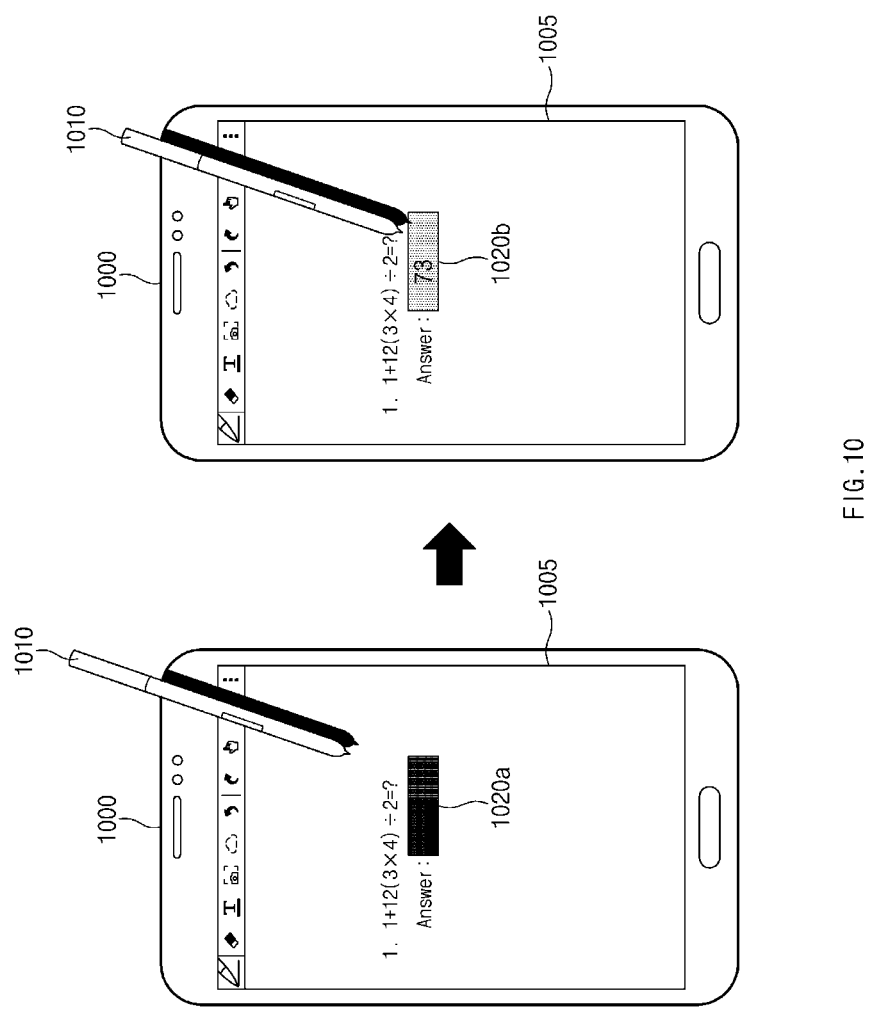
FIG. 10 illustrates a method for adjusting a transparency of an image object according to a user input according to various embodiments of the present disclosure.

FIG. 10 illustrates a method for adjusting a transparency of an image object according to a user input according to various embodiments of the present disclosure.

Referring to a drawing shown in the left of FIG. 10, an image object 1020*a* may be displayed together with an expression on a screen 1005 of an electronic device 1000. In this case, as shown in a drawing shown in the right of FIG. 10, a user input 1010 may be moved and stopped on the image object 1020*a*. In this case, the processor 430 may adjust a transparency of the image object 1020*a* to a transparency of the image object 1020*b* according to the user input 1010. Therefore, a user may see a right answer displayed under a semi-transparent image object 1020*b*.

FIG. 10 illustrates an example in which the user input 1010 hovers over the image object 1020*a*. The scope and spirit of the present disclosure may not be limited thereto.

According to various embodiments of the present disclosure, when the user input 1010 moves on an object '73', the processor 430 may select the object according to the user input 1010. The selected object may be corrected such that at least a part of the selected object is deleted by a user or an object is additionally input by him or her.

Figure 11:
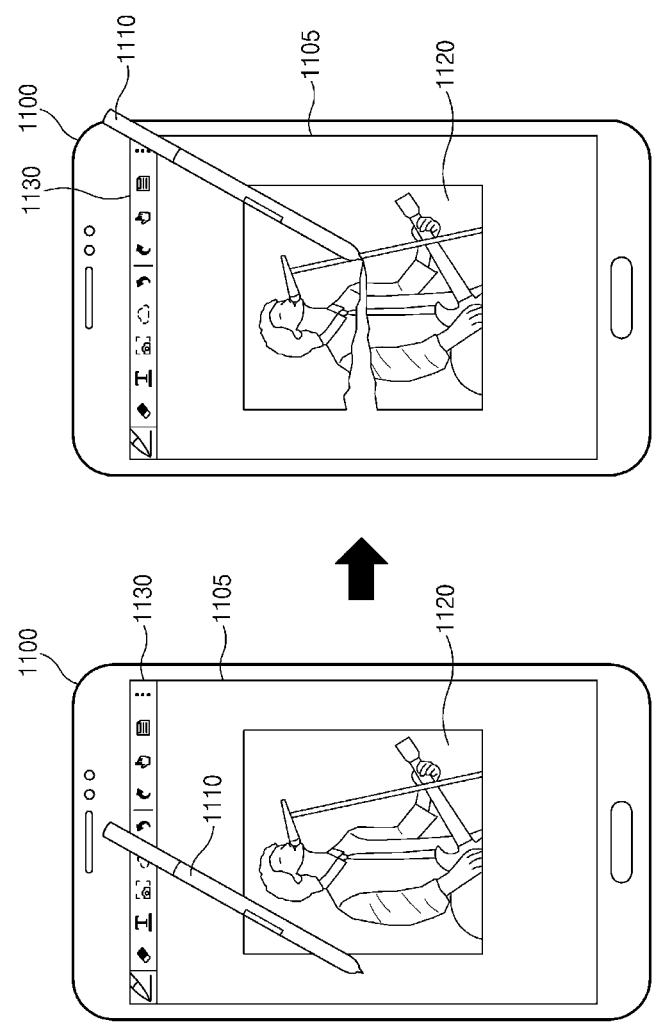
FIG. 11 illustrates a method for modifying at least a part of an image object according to a user input according to various embodiments of the present disclosure.

FIG. 11 illustrates a method for modifying at least a part of an image object according to a user input according to various embodiments of the present disclosure. Difference between FIGS. 5A to 5C and FIG. 11 may be, for example, a writing speed. FIGS. 5A to 5C illustrate difference according to a movement distance per unit time by comparing FIGS. 5A and 5B. According to various embodiments of the present disclosure, an operation of writing in FIG. 5A or an operation of modifying a region in FIG. 11 may be selected according to a predetermined movement distance value per unit time.

Referring to FIG. 11, in a menu object 1130, a user input 1110 may correspond to a ballpoint pen. An operation of modifying at least a part of an image object 1120 may be intuitive. It is assumed that the user input 1110 is the ballpoint pen and the image object 1120 is a photo. When the ballpoint pen moves quickly, a tip of the ballpoint pen may move at high speed on the photo. In this case, the photo may be torn as illustrated on a screen 1105 of an electronic device 1100. Therefore, a processor 430 of FIG. 4 may modify at least a part of the image object 1120 according to a movement distance per unit time of the user input 1110.

Figure 12:
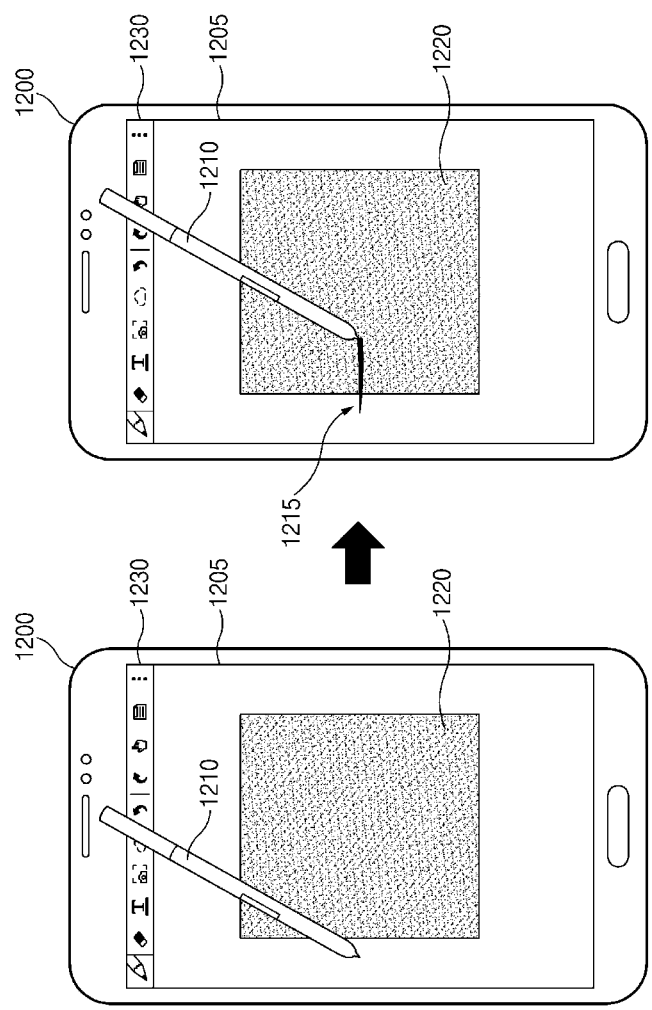
FIG. 12 illustrates a change of a drawing image according to attributes of an image object according to various embodiments of the present disclosure.

FIG. 12 illustrates a change of a drawing image according to attributes of an image object according to various embodiments of the present disclosure.

Referring to FIG. 12, the processor 430 of FIG. 4 may analyze an image object 1220, which may be an image for sand or gravel. The processor 430 may set material qualities of the image object 1220 to sand or gravel by analyzing the image object 1220.

Referring to a menu object 1230, a user input 1210 may be about a pencil. A pencil lead is configured with a graphite structure in which multiple layers are laminated. Therefore, when a user more writes with the pencil, the pencil lead may become blunter and blunter. Therefore, a thickness of a line included in a drawing object 1215 may be expressed, as illustrated on a screen 1205 of an electronic device 1200, to become thicker and thicker from a time point when the drawing object 1215 passes through the image object 1220.

Figure 13:
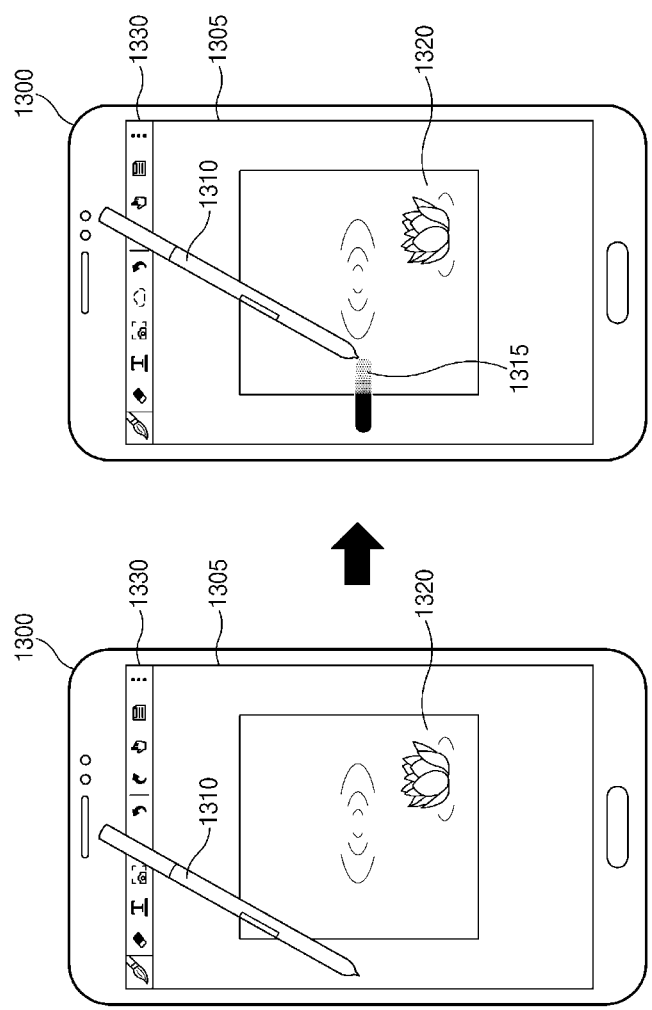
FIG. 13 illustrates a change of a drawing image according to attributes of an image object according to various embodiments of the present disclosure.

FIG. 13 illustrates a change of a drawing image according to attributes of an image object according to various embodiments of the present disclosure.

Referring to FIG. 13, the processor 430 of FIG. 4 may analyze an image object 1320 may be an image for water. The processor 430 may set material qualities of the image object 1320 to water by analyzing the image object 1320.

Referring to a menu object 1330, a user input 1310 may be about a brush (pen). Therefore, the processor 430 may express a drawing object 1315 illustrated on a screen 1305 of an electronic device 1300 such that a thickness of a line included in the drawing object 1315 becomes more and more faded from a time point when the drawing object 1315 passes through the image object 1320.

According to various embodiments of the present disclosure, an electronic device may include a display module configured to display at least one or more objects on a screen, a user input module configured to receive a user input, and a processor configured to compare a coordinate of each of the objects with a coordinate of the user input and to control attributes of each of the objects.

According to various embodiments of the present disclosure, the processor may generate a drawing object corresponding to the user input. The controlling of the attributes of each of the objects in the processor may be determining an order of overlapping the object with the drawing object.

According to various embodiments of the present disclosure, the determining of the order of overlapping the object with the drawing object in the processor may be performed according to a tilted direction of a user input corresponding to the user input (see FIGS. 5A and 5C).

According to various embodiments of the present disclosure, the controlling of the attributes of each of the objects in the processor may be changing a drawing color corresponding to the drawing object according to a color of the object.

According to various embodiments of the present disclosure, the controlling of the attributes of each of the objects in the processor may be changing a color of the object according to a drawing color corresponding to the drawing object.

According to various embodiments of the present disclosure, the controlling of the attributes of each of the objects in the processor may be to determine whether to select the object when the user input moves on a region of the object and when a part of a drawing object, which is expanded in response to the user input, is overlapped with the object.

According to various embodiments of the present disclosure, the determination whether to select the object in the processor may be performed according to a movement speed at which the user input moves on a region of the object.

According to various embodiments of the present disclosure, the controlling of the attributes of each of the objects may be performed while a coordinate of the object is fixed, without moving the object.

According to various embodiments of the present disclosure, the controlling of the attributes of each of the objects in the processor may be performed according to at least one or more of states of the user input including a touch-down, a touch move, and a touch release, a movement speed of the user input, a tilt of an input tool of the user input, pressure of the user input, whether the input tool rotates, whether the user input is a touch input or a hover input, or whether a started position of the user input is within a region of the object.

According to various embodiments of the present disclosure, the objects may include an image object and a drawing object corresponding to the user input. The processor may obtain image attributes including material qualities of an image displayed on the image object through image analysis. The controlling of the attributes of each of the objects in the processor may be controlling drawing attributes corresponding to the drawing object according to the obtained image attributes.

According to various embodiments of the present disclosure, the drawing attributes may include at least one or more of a drawing tool, a drawing color, a drawing thickness, or a drawing depth.

According to various embodiments of the present disclosure, the objects may include a menu object, a drawing object, an image object, and a layer object including a plurality of objects. The controlling of the attributes of each of the objects in the processor may be performed according to a kind of each of the objects or a kind of a drawing tool of the drawing object.

According to various embodiments of the present disclosure, the controlling of the attributes of each of the objects in the processor may be controlling attributes for at least one or more of two or more objects when the two or more objects are overlapped.

According to various embodiments of the present disclosure, the controlling of the attributes of each of the objects in the processor may include at least one or more of activating each of the objects to select each of the objects, inactivating each of the objects not to select each of the objects, controlling a transparency of each of the objects, or adjusting the overlapped order of two or more overlapped objects.

Figure 14:
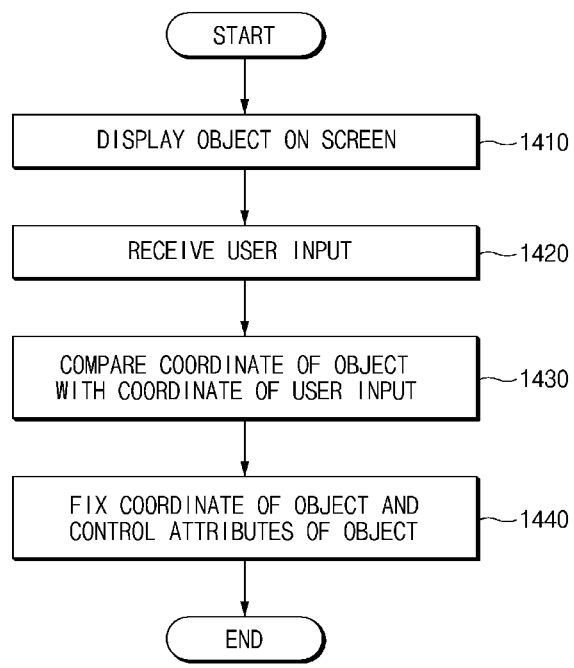
FIG. 14 is a flowchart illustrating a method for controlling attributes of an object according to a user input according to various embodiments of the present disclosure.

FIG. 14 is a flowchart illustrating a method for controlling attributes of an object according to a user input according to various embodiments of the present disclosure.

Referring to FIG. 14, a method for changing attributes of an object according to a user input according to various embodiments of the present disclosure may include operations processed in time series in an electronic device according to various embodiments of the present disclosure shown in FIGS. 1 to 13. Therefore, although there are omitted contents below, contents described about the electronic device of FIGS. 1 to 13 may be applied to the method for changing the attributes of the object according to the user input according to an embodiment of the present disclosure shown in FIG. 14.

Referring to FIG. 14, in operation 1410, the electronic device may display an object on a screen of the electronic device. The object may be displayed on the screen through a specific application.

In operation 1420, the electronic device may receive a user input on the screen from a user of the electronic device. In this case, the user input may include a hover input, a motion input, and the like as well as a touch input.

In operation 1430, the electronic device may compare a coordinate of the object displayed in operation 1410 with a coordinate of the user input received in operation 1420.

In operation 1440, when the coordinate of the object corresponds to the coordinate of the user input as a result of the comparison in operation 1430, the electronic device may fix the coordinate of the object and may change attributes for the object.

The order of operations 1410 to 1440 described above with reference to FIG. 14 may be, but is not limited to, an example. In other words, the order of the above-described operations may be changed to each other, and some of the operations may be simultaneously performed. In addition, the above-described operations may be periodically repeated per predetermined time and may be performed again according to a user input.

According to various embodiments of the present disclosure, an object control method for an electronic device may include displaying at least one or more objects on a screen of the electronic device, receiving a user input, and comparing a coordinate of each of the objects with a coordinate of the user input and controlling attributes of each of the objects.

According to various embodiments of the present disclosure, the object control method may further include generating a drawing object corresponding to the user input. The controlling of the attributes of each of the objects may include determining an order of overlapping the object with the drawing object.

According to various embodiments of the present disclosure, the controlling of the attributes of each of the objects may be performed according to at least one or more of states of the user input including a touch-down, a touch move, and a touch release, a movement speed of the user input, a tilt of an input tool of the user input, pressure of the user input, whether the input tools rotates, whether the user input is a touch input or a hover input, or whether a started position of the user input is within a region of the object.

According to various embodiments of the present disclosure, the controlling of the attributes of each of the objects may include controlling attributes for at least one or more of two or more objects when the two or more objects are overlapped.

According to various embodiments of the present disclosure, the controlling of the attributes of each of the objects may include at least one or more of activating each of the objects to select each of the objects, inactivating each of the objects not to select each of the objects, controlling a transparency of each of the objects, or adjusting the overlapped order of two or more overlapped objects.

According to various embodiments of the present disclosure, a method for displaying a predetermined effect in an electronic device may include displaying an object on a screen of the electronic device, receiving a user input, comparing a coordinate of the object with a coordinate of the user input, and fixing the coordinate of the object and displaying the predetermined effect on the object.

According to various embodiments of the present disclosure, the method may further include determining a movement distance at which the user moves on the object during a unit time. In this case, the predetermined effect may be determined according to a movement distance per unit time of the user input.

According to various embodiments of the present disclosure, when the movement distance per unit time of the user input is greater than or equal to a threshold value, the predetermined effect may be to inactivate the object with respect to the user input.

According to various embodiments of the present disclosure, when the movement distance per unit time of the user input is less than the threshold value, the predetermined effect may be to select the object through the user input.

According to various embodiments of the present disclosure, the predetermined effect may be to adjust the overlapped order of the objects corresponding to a coordinate of the user input among a plurality of objects, at least some of which are overlapped.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing predetermined operations.

According to various embodiments of the present disclosure, at least a part of a device (e.g., modules or the functions) or a method (e.g., operations) may be implemented with, for example, instructions stored in a computer-readable storage media which has a program module. When the instructions are executed by a processor (e.g., the processor 120 of FIG. 1), one or more processors may perform functions corresponding to the instructions. The computer-readable storage media may be, for example, the memory 130 of FIG. 1.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. In addition, some operations may be executed in a different order or may be omitted, and other operations may be added.

According to various embodiments of the present disclosure, the electronic device may control attributes of an object displayed on a screen of the electronic device according to a user input. Therefore, the electronic device may consult user convenience by preventing an object from automatically avoiding a user input and moving a coordinate not to correspond to the intention of the user and preventing a user input from not being applied by the object.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display module;
a user input module included in the display module; and
a processor configured to:
displaying an object on the display module,
receive a user input and determine a state and a movement speed of the user input using the user input module, and
based on the state and the movement speed of the user input, determine whether to control attributes of the object while generating a drawing object corresponding to the user input or to select the object.

2. The electronic device of claim 1, wherein the processor is further configured to:
generate the drawing object according to a drawing input, wherein the drawing input is included in the user input, and
determine an overlapping order of the object with the drawing object.

3. The electronic device of claim 2, wherein the processor is further configured to determine the overlapping order of the object with the drawing object according to a tilted direction of a drawing input tool corresponding to the drawing input.

4. The electronic device of claim 1, wherein the processor is further configured to change a drawing color corresponding to the drawing object according to a color of the object.

5. The electronic device of claim 1, wherein the processor is further configured to change a color of the one of the objects according to a drawing color corresponding to the drawing object.

6. The electronic device of claim 2, wherein the processor is further configured to:
compare a coordinate of the object with a coordinate of the drawing input, and
inactivate the object based on the comparison result.

7. The electronic device of claim 2, wherein the processor is further configured to determine whether to inactivate the object according to a movement speed at which the drawing input moves on the area.

8. The electronic device of claim 1, wherein the processor is further configured to inactivate the object while a coordinate of the object is fixed, without moving the object.

9. The electronic device of claim 1, wherein the processor is further configured to inactivate the object according to at least one of:
the state of the user input including a touch-down, a touch move, and a touch release,
a movement speed of the drawing input,
a tilt of an input tool providing the drawing input,
pressure of the drawing input,
whether the input tool rotates,
whether the drawing input is a touch input or a hover input, or
whether a started position of the drawing input is within the area of the object.

10. The electronic device of claim 1,
wherein the processor is further configured to:
obtain image attributes including material qualities corresponding to the object through image analysis, and
control attributes of the drawing object according to the obtained image attributes.

11. The electronic device of claim 10, wherein the attributes of the drawing object comprise at least one of a drawing tool, a drawing color, a drawing thickness, or a drawing depth.

12. The electronic device of claim 1,
wherein the object comprises a menu object, a drawing object, an image object, or a layer object including a plurality of objects.

13. The electronic device of claim 1, wherein the processor is further configured to control a transparency of the object.

14. An object control method for an electronic device, the method comprising:
displaying an object on a display module of the electronic device;
receiving a user input and determining a state and a movement speed of the user input using the user input module; and
determining whether to control attributes of the object while generating a drawing object corresponding to the user input or to select the object based on the state and the movement speed of the user input.

15. The method of claim 14, further comprising:
generating the drawing object according to a drawing input, wherein the drawing input is included in the user input; and
determining an overlapping order of the object with the drawing object.

16. The method of claim 15, further comprising:
inactivating of the object for the drawing input performed according to at least one of:
the state of the user input including a touch-down, a touch move, and a touch release,
a movement speed of the drawing input,
a tilt of an input tool providing the drawing input,
pressure of the drawing input,
whether the input tool rotates,
whether the drawing input is a touch input or a hover input, or
whether a started position of the drawing input is within the area of the object.

17. The method of claim 16, wherein the inactivating of the object for the drawing input comprises:
comparing a coordinate of the object with a coordinate of the drawing input; and
inactivating the object based on the comparison result.

18. The method of claim 14, further comprising:
controlling a transparency of the object.

19. At least one non-transitory computer readable recording medium for storing a computer program configured to be readable by at least one processor for instructing the at least one processor to execute a computer process for performing the method of claim 14.

* * * * *